United States Patent [19]

Reese et al.

[11] 4,047,916

[45] Sept. 13, 1977

[54] METHOD AND APPARATUS FOR BENDING GLASS SHEETS TO DOUBLE V-BENDS

[75] Inventors: Thomas J. Reese, Sarver; James R. Mortimer, Natrona Heights; Melvin W. Tobin, New Kensington; Stephen J. D. Jursa, Saxonburg, all of Pa.

[73] Assignee: PPG Industries, Inc., Pittsburgh, Pa.

[21] Appl. No.: 725,054

[22] Filed: Sept. 21, 1976

[51] Int. Cl.$^2$ .................................... C03B 23/02
[52] U.S. Cl. ................................ 65/106; 65/273; 65/291
[58] Field of Search ............. 65/106, 107, 273, 274, 65/275, 290, 291

[56] References Cited

U.S. PATENT DOCUMENTS 2,176,999  10/1939  Miller .............................. 65/287 X Primary Examiner—Arthur D. Kellogg
Attorney, Agent, or Firm—Dennis G. Millman; Edward I. Mates

[57] ABSTRACT

This invention relates to a method and apparatus for bending glass sheets in pairs to a so-called double V-bend in which the glass is bent sharply across its width along two lines of sharp bending to form a pair of sharply bent longitudinal extremity portions. The gist of the invention is the application to a sectionalized mold of weighted elongated electroconductive ribbons which are unattached to any mold structure and each of which is readily applied to and removed from positions above the upper surface of the glass sheets mounted on the mold for bending in sliding superimposed relation to a pair of electrodes along lines aligned with the lines of sharp bending. The ribbons are maintained in spaced relation to the glass throughout the bending operation so as to avoid marking the glass. The mold sections terminate at locations along transverse lines aligned with and slightly below the ribbons.

8 Claims, 6 Drawing Figures

METHOD AND APPARATUS FOR BENDING GLASS SHEETS TO DOUBLE V-BENDS

BACKGROUND OF THE INVENTION

1. Field of the Invention

The present invention relates to bending glass sheets in pairs to sharp curvatures including a pair of sharp bends extending across the width of the glass sheet near the longitudinal extremities thereof. These bends are popularly known as double V-bends.

Glass sheets have been bent by the sag bending method by mounting glass sheets on outline molds of the skeleton type and introducing the glass sheet laden molds into a furnace where the glass sheets are heated to a deformation temperature and sagged to conform to the upper surface of the mold. Glass sheets are also bent to sharp curvatures by combining with the overall heat in an enclosed furnace, localized heat applied along the lines to be sharply bent either from elongated heating elements closely spaced to the lines of sharp bending of the glass or along lines of electroconductive material applied to the glass surface along lines of sharp bending.

In bending glass sheets in pairs, it is important to provide greater heat to the upper surface of the pair of sheets mounted for bending than to the lower surface so that the sheets bend in unison. If too great a proportion of the total heat is applied to the bottom of the pair, gaps form between the sheets which make the task of laminating the bent sheets to one another difficult.

In the past, electrical heating elements incorporated in molds for providing elongated lines of sharp bending in the glass have been either rigid rods or electroconductive ribbons attached to some structure on the bending molds. This has caused considerable difficulty in storing unused molds when other patterns are in production.

Sharp bends have been produced in glass by applying electroconductive materials which remain on the glass surface after the sheet is bent to the shape desired. Frequently, the material must be removed and removing the electroconductive materials presents problems.

Sharp bends have also been produced by applying electroconductive heating elements or mounting means therefor directly to at least the upper surface of glass sheets to be shaped. This method has several drawbacks including the fact that elements that contact the glass surfaces while the latter are hot tend to mark the glass.

2. Description of the Prior Art

In recent years, several patents have issued relating to the bending of glass sheets to sharp curvatures. U.S. Pat. No. 3,762,903 to Harold E. Hamilton; U.S. Pat. No. 3,762,904 to Harold E. Hamilton, Robert E. Bamford and Paul Pastorek; U.S. Pat. No. 3,879,184 to Harold E. Hamilton and Ivan L. Soreghy; an U.S. Pat. No. 3,865,680 to Thomas J. Reese and Harry S. Koontz disclose glass bending methods and apparatus employing lines of electroconductive material that are applied directly to the glass surface to help form the sharp bend along lines of sharp bending U.S. Pat. No. 3,795,501 to Robert A. Jansson and Thomas J. Reese; U.S. Pat. No. 3,795,570 to Robert A. Jansson and Dean L. Thomas; and U.S. Pat. No. 3,847,586 to Thomas J. Reese, George R. Claassen and Melvin W. Tobin disclose gravity sag molds that incorporate flexible metal ribbons as auxiliary heating elements that augment the heating of glass sheets along elongated lines of sharp curvature.

U.S. Pat. No. 2,111,392 to Henry J. Galey; U.S. Pat. No. 2,176,999 to Robert A. Miller; U.S. Pat. No. 2,215,228 to James G. Oliver; U.S. Pat. No. 2,999,338 to Ronald L. Richardson; and U.S. Pat. No. 3,248,195 to James S. Golightly and Harold E. McKelvey disclose bending apparatus having electroconductive radiant heaters other than elongated flexible ribbons that apply sharp localized bends to a glass sheet along an elongated axis thereof. However, these patents show apparatus that support the heating elements in such positions that makes it difficult and time consuming to load or unload a glass sheet from the mold. Furthermore, many of these patents provide heaters that are permanently attached to the mold so that it is difficult to store molds that are not being used in production without requiring a great deal of space for mold storing purposes.

It has also been proposed to support one or more heating ribbons below the position occupied by a single glass sheet during bending in order to facilitate loading and unloading of the glass sheet so as to avoid the time delay needed to apply and remove the ribbons for each bending cycle. Such positioning of heating ribbons is impractical when two glass sheets are bent simultaneously in pairs because, unless the additional heat from the ribbons is applied from above the pair of glass sheets, the sheets separate during bending, thus making it difficult to laminate the bent glass sheets.

SUMMARY OF THE INVENTION

The present invention provides apparatus for bending glass sheets to sharp curvatures which incorporate a sectionalized bending mold of the outline type provided with readily mountable and readily removable flat, flexible electroconductive ribbons which are not attached to any mold structure and are superimposed over and closely spaced to the position occupied by the elongated portions of the glass sheets to be sharply bent in a glass sheet bending cycle. Electrode means are provided with a ribbon engaging surface to support the ribbons at a level slightly above the glass and weight means are provided beyond each electrode means to tension each ribbon, to insure good ribbon-to-electrode contact and to keep the ribbons from sagging into contact with the glass sheet during the bending cycle. The central section of the mold comprises two elongated shaping rails whose ends provide supports for the flat glass intermediate the longitudinal ends of the latter. The intermediate supports are located in transversely extending lines substantially aligned with each of the electroconductive ribbons.

In the method employed by the present invention, a pair of glass sheets is mounted on a sectionalized outline mold for bending and supported intermediate its longitudinal extremities on spaced supports along the outline shaping surface of the mold in a plane such that the lines of sharp bending for the glass are aligned with transverse lines of support defined by transversely spaced supports at the ends of the central mold section. During the bending cycle, the glass is heated to its deformation temperature wherein the central portion intermediate said transversely extending lines of support begins to sag very slightly to the upper shaping surface of the mold. At this point, electrical energy is applied to the flexible electro-conductive ribbons supported along transverse lines of support by pairs of transversely spaced electrodes along a line slightly above the plane of the upper surface of the glass supported by said intermediate supports along lines substantially aligned a short distance over the transverse lines defined by the support points. The energized ribbons radiate heat along the lines of sharp bending so as to accelerate the heating of the glass along the lines to be sharply bent.

When the glass sheets are heated while mounted on the mold, the longitudinal extremity portions of the glass longitudinally outward of the transverse lines facing the ribbons are lifted by the end mold sections while elongated, transversely extending lines of the glass which face the ribbons and which are supported by said intermediate supports remain in the same plane as their original plane of support. This combination of upward lifting by the end sections and line heating promotes sharper bends along the lines facing the ribbons.

The electroconductive heating elements comprising said ribbons are easily applied to the mold over the glass after the glass is loaded onto the mold prior to bending and easily removed from the mold after the bend is completed without requiring any attachment or disconnection step. Weight means are attached to the ribbons beyond the support provided by the electrodes to tension the ribbons as they expand thermally due to the application of voltage to maintain the ribbons along the same line that they occupy when first applied to the mold. As the ribbon expands thermally due to the application of current therethrough, the weights at the ends of the ribbon pull each ribbon over smoothly polished grooved surfaces of a transversely spaced pair of grooved electrodes over which they are mounted so as to maintain the ribbons taut and in a straight line parallel to the straight line of sharp bending for the glass sheet.

The ribbons are removed readily before a pair of bent glass sheets is removed from the mold without requiring any time consuming step to disconnect the ribbons from the mold. After loading another pair of glass sheets on the mold, the ribbons are easily applied over the pair of glass sheets without requiring any time consuming step to connect the ribbons to the mold. In this manner, the present invention provides means for reducing the time needed to place the electroconductive ribbons where they are most efficient in bending a pair of aligned glass sheets simultaneously and to remove the ribbons before the bent glass sheets can be removed from the mold.

Glass sheets bent in pairs to double V-bends on molds provided with heating ribbons disposed over the glass sheet pairs during sag bending conform closely enough to one another to be readily laminated with a low incidence of breakage due to mismatching of shapes in the glass sheets constituting the bending pair.

The advantages of the present invention will become more obvious in the light of a description of an illustrative embodiment that follows.

BRIEF DESCRIPTION OF THE DRAWINGS

In the drawings which form part of the description of the illustrative embodiment wherein like reference numbers refer to like structural elements.

DESCRIPTION OF THE PREFERRED EMBODIMENT

Figure 1:
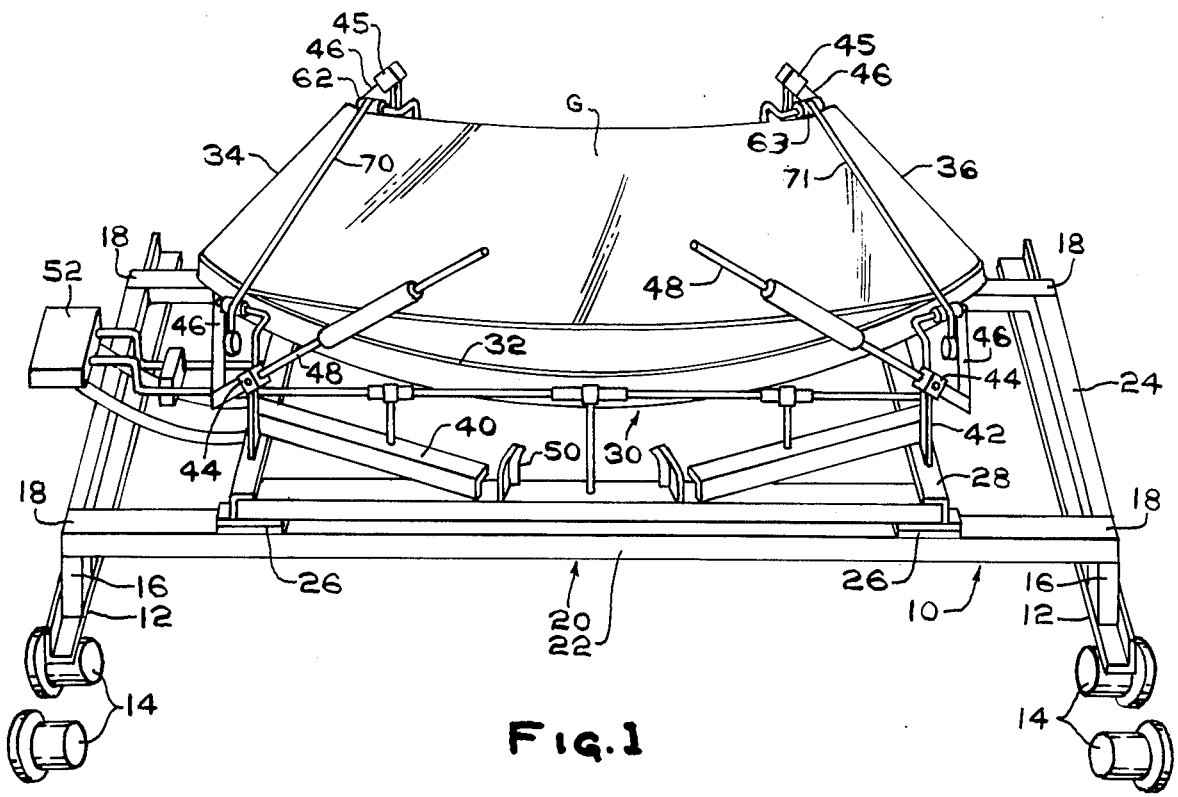
FIG. 1 is a perspective view of a sectionalized glass sheet bending mold in the open position for mounting a pair of glass sheets preparatory to bending.

According to an illustrative embodiment of the present invention, a mold supporting carriage 10 is provided with rails 12 that ride on conveyor rolls 14 of a conveyor that extends through a heating furnace (not shown). The carriage rails 12 of the mold supporting carriage 10 each support vertical posts 16 (only two of which are shown) for contacting each corner 18 of an upper frame 20 of the mold supporting carriage 10. The frame 20 comprises a pair of longitudinally extending frame members 22 interconnected by transversely extending frame members 24 to form the four corners 18 of the upper frame 20. Each longitudinally extending frame member 22 supports a pair of small platforms 26 of electrically insulating material (for example, an asbestos type of cement sold under the trademark TRANSITE) on which are mounted the corners of a frame 28 of a sectionalized bending mold shown at 30 (see also FIG. 6).

Figure 2:
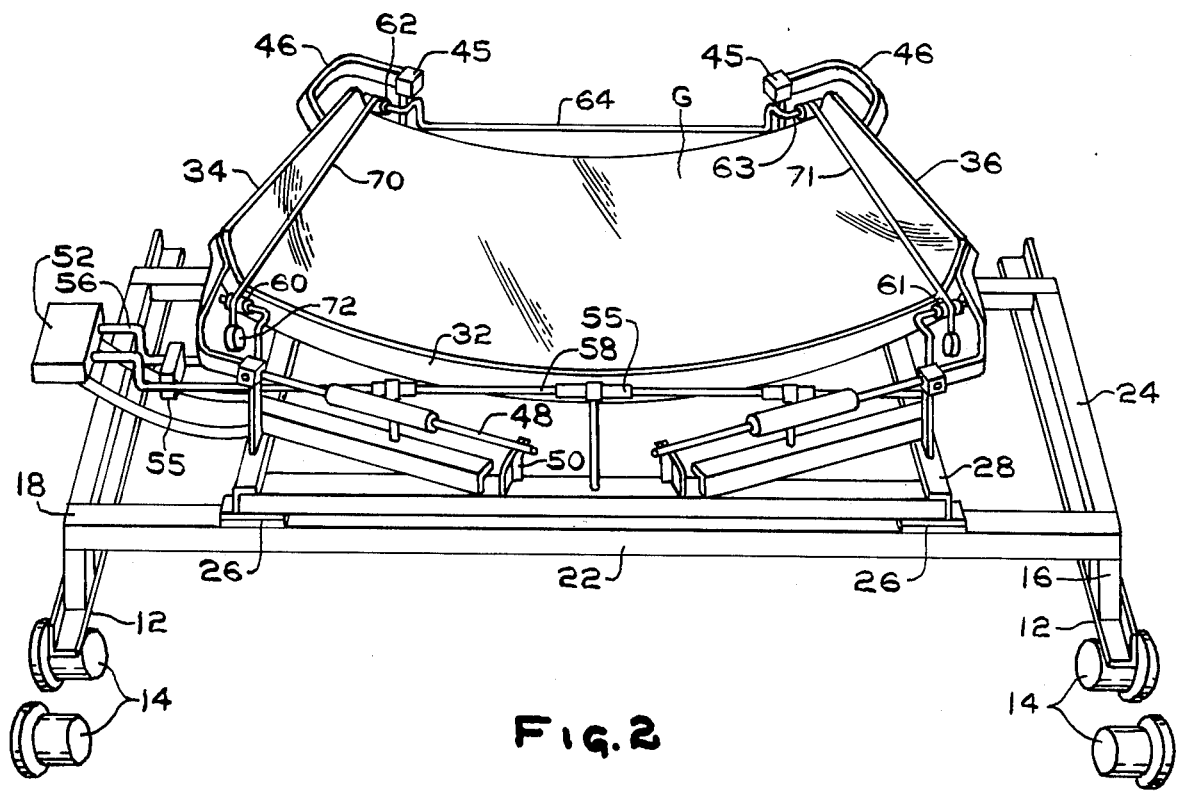
FIG. 2 is a view similar to FIG. 1 showing the mold in its closed position with the glass sheet bent to conform to the shape of the closed mold.
Figure 3:
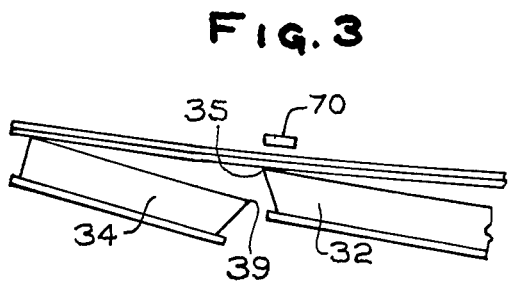
FIG. 3 is an enlarged fragmentary view showing the relation of an end mold section and an adjacent longitudinal extremity of a central mold section to the ribbon and supported glass in the open mold position.
Figure 4:
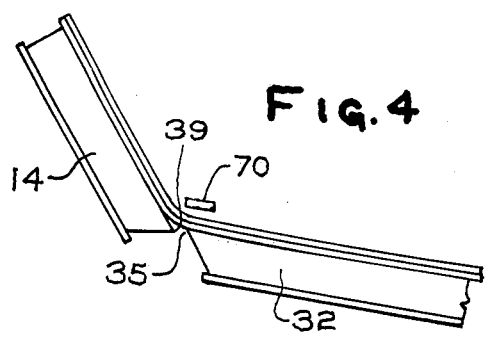
FIG. 4 is a view similar to that of FIG. 3 showing the relative positions occupied by the respective portions of the mold and the glass after the latter is bent.
Figure 6:
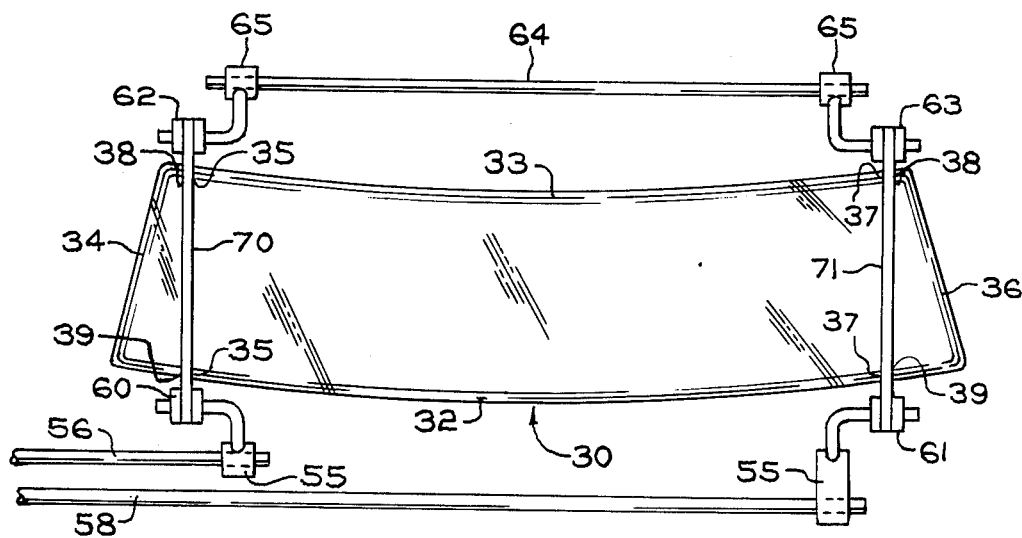
FIG. 6 is a schematic plan veiw showing how the weighted flexible electroconductive ribbons close an electroconductive circuit between the electrodes during the process pursuant to the present invention and also showing the positional arrangement of the electrodes and the mold sections of a sectionalized mold.

The sectionalized bending mold comprises a front longitudinally extending shaping rail 32, which is shown in FIGS. 1, 2 and 6 and a rear longitudinally extending shaping rail 33 shown in FIG. 6.

An end mold section 34 is located beyond a pair of transversely spaced, longitudinal extremeties 35 (FIG. 6) at corresponding ends of the longitudinally extending shaping rails 32 and 33, while another end mold section 36 is located beyond a pair of transversely spaced longitudinal extremities 37 at the other ends of rails 32 and 33.

Each of the shaping rails 32 and 33 and each of the end mold sections 34 and 36 are in the form of edgewise disposed rails 1½ inch (38 millimeters) wide and ⅛ inch (3 millimeters) thick with the upper edges rounded in section and shaped along their lengths to conform to the shape desired slightly inward of the outline of the glass sheet to be bent. The rails may be reinforced or thickened along their bottom edges. Each end mold section 34 and 36 extends from an inner end 38 adjacent an end 35 or 37 of rail 33 at the inner end of a short longitudinal leg around a transverse end leg and a long longitudinal leg to an inner end 39 of the latter adjacent an end of rail 32.

The end sections 34 and 36 are pivoted with respect to the ends of shaping rails 32 and 33 between a flat glass receiving position depicted in FIG. 1 and a closed mold position depicted in FIG. 2. To effect this pivotal arrangement, the frame 28 has reinforcements 40 near each corner thereof, each reinforcement helping to support a post 42 on the top of which is mounted a front bearing housing 44 provided along and outside the front shaping rail 32 as seen in FIGS. 1 and 2 or a rear bearing housing 45 of similar nature provided along and outside the rear shaping rail 33. An outrigger 46 is rigidly connected to each of the end mold sections 34 and 36 and extends longitudinally inward of the mold to a pivotal connection around a bearing housing 44 or 45. The front outriggers 46 at least extend beyond the bearing housings 44 to form lever arms 48. The lever arms 48 are weighted in such a manner that normally the end mold sections 34 and 36 pivot about transverse axes of pivoting defined by bearing housings 44 and 45 into the closed mold position of FIG. 2 where the upper edge surfaces of the end mold sections 34 and 36 cooperate with the upper edge surfaces of shaping rails 32 and 33 to form a substantially continuous shaping surface having the elevation and outline desired immediately within the outline of the glass sheet after bending.

Stop members 50 are provided on the frame 28 for engagement by lever arms 48 to prevent the end mold sections 34 and 36 from pivoting beyond the positions that they are desired to occupy with respect to the longitudinal extending shaping rails 32 and 33 of the center mold section in the closed mold position wherein the inner ends 38 of the end mold sections 34 and 36 are adjacent the ends of rail 33 and the inner ends 39 are adjacent the ends of rail 32.

The mold frame 28 also supports a terminal box 52. The latter is provided with means for connecting thereto a pair of electrodes (not shown) from a power source. From the terminal box 52, various insulated supports 55 carry a rigid, insulated wire 56 that extends to an electrode 60 and another rigid, insulated wire 58 that extends to another electrode 61. Electrodes 60 and 61 are located laterally outside and slightly above the longitudinal extremities of front shaping rail 32. The insulated wires are rigid enough to support the electrodes 60 and 61 in insulated relation to the bending mold 30 and the bending mold frame 28. Another pair of electrodes 62 and 63 is carried on the opposite lateral side of the mold laterally outside of the rear, longitudinally extending shaping rail 33. The electrodes 62 and 63 at the rear of the mold as seen in the views of FIGS. 1 and 2 are interconnected by a rigid insulated wire 64 similar to rigid, insulated wires 56 and 58. The rigid, insulated wire 64 is supported in insulated relation to the carriage 10 and mold 30 on insulated supports 65 (FIG. 6).

Figure 5:
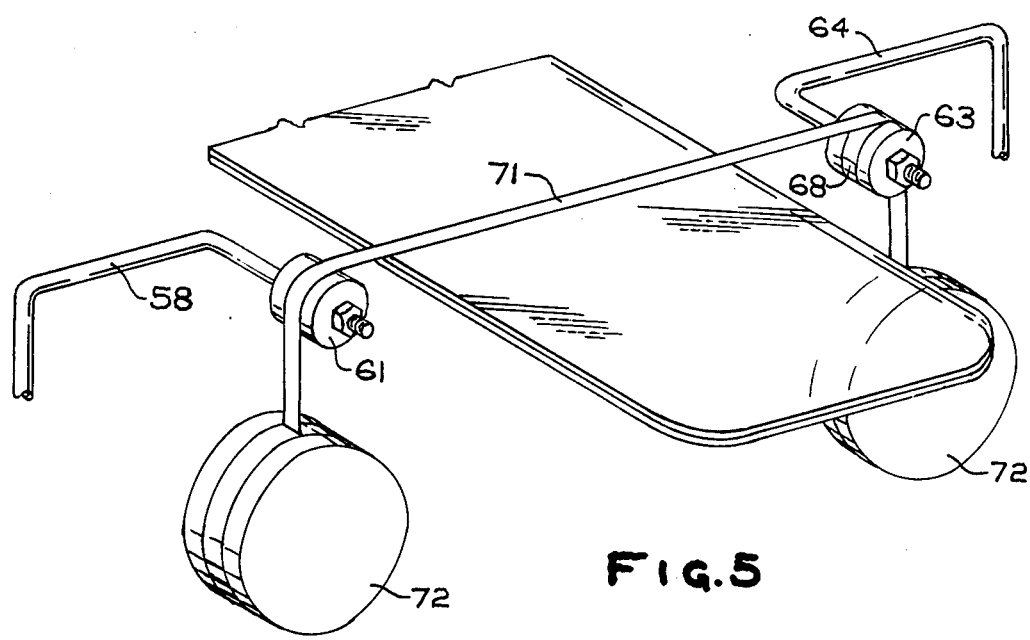
FIG. 5 is a fragmentary, perspective, schematic view showing how a flexible electroconductive ribbon is mounted on a pair of electrodes and provided with weight means to maintain the ribbon taut during the bending operation.

Each of the electrodes 60 to 63 is in the form of a polished metal cylinder having a grooved central portion 68 (see FIG. 5). Each groove extends circumferentially of its associated electrode to provide a ribbon engaging surface. The electrodes 60 and 62 are so arranged that their grooved portions 68 extend in a transverse direction of said mold and the transverse line between their grooved portions 68 is aligned with and slightly above the transverse line extending between the longitudinal extremities 35 of rails 32 and 33 and the grooved portions 68 of electrodes 61 and 63 are aligned and oriented so that the line between said latter grooved portions 68 is aligned with and slightly above the line extending between the longitudinal extremities 37 of rails 32 and 33.

An elongated electroconductive ribbon 70, preferably of nichrome, is mounted in sliding relation over the grooved portions 68 of the pair of transversely spaced electrodes 60 and 62 and in unattached relation to any structural element of the mold 30 or its supporting carriage 10. Another elongated electroconductive ribbon 71 identical to ribbon 70 is mounted in sliding relation over the grooved portions 68 of the pair of transversely spaced electrodes 61 and 63, also in unattached relation to any structural element. A weight 72 is spot welded to each end of each ribbon 70 and 71.

Electrodes 60 to 63 are preferably stainless steel cylinders 1 inch (25 millimeters) long and 1 inch (25 millimeters) in diameter and located so that the uppermost portions of their circumferentially extending grooved portions 68 providing the ribbon engaging surfaces are ¼ inch (6 millimeters) wide and 30 mils (0.08 millimeter) deep and are located at elevations approximately ¼ inch (6 millimeters) plus the thickness of the glass above the adjacent longitudinal extremity 35 or 37 of shaping rail 32 or 33. In this manner, the grooved portions 68 support the ribbons 70 and 71 along spaced transverse lines substantially aligned with the lines between corresponding extremities 35 and 37 so as to insure that the ribbons extend in facing relation to the respective lines of sharp bending. The weights 72 (preferably stainless steel about 1 pound (450 grams) tension the ribbons so that they extend about ¼ inch (6 millimeters) above the upper surface of the glass sheets and remain out of contact with the glass even when energized with electricity which causes them to expand thermally.

The cylindrically shaped electrodes 60 to 63 are adjustable in position by lock nuts that flanked each end of the cylinder. The lock nuts mate with external threads at corresponding portions of the rigid wires 56, 58 and 64 so as to adjust and lock the position of the electrodes if needed. Provision can also be made for vertical adjustment of the position of each electrode.

EXAMPLE

Glass sheets were mounted in matched pairs each about 100 mils (2.5 millimeters) thick, 60 inches (1727 millimeters) long and 33 inches (838 millimeters) wide on a mold whose carriage was one meter wide provided with grooved electrodes but no ribbon. Then, a pair of ribbons weighted at their ends was applied in sliding relation to the grooved portions and their weights holding the ribbon taut. No part of either ribbon was connected to any mold structure.

The mold was introduced into a bending lehr having four zones having respective lengths of 20 feet (6 meters), 7 feet (2.1 meters), 7.25 feet (2.2 meters) and 25 feet (8 meters) and whose thermocouples read 1020° F., 1170° F., 1100° F., and 800° F., respectively, and heated to raise the glass to approximately its deformation temperature and electrical current supplied to the ribbons for a short period followed by additional furnace heat without ribbon heat to complete the bend. The mold was oriented with the rail 33 disposed as the forward side and rail 32 as the trailing side.

In a bending operation to produce a windshield sample having a double V-bend, a pair of nichrome ribbons 3/16 inch (5 millimeters) wide and 0.0063 inch (0.16 millimeter) thick extending 31.5 inches (80 centimeters) between electrodes was used with the ribbons spaced about ¼ inch (6 millimeters) from the upper glass surface. A successful bend resulted from the following program:

1. Furnace heat in the first furnace zone for 5 minutes 45 seconds without electrical power to ribbon.
2. Continue furnace heat in the first furnace zone for 3 minutes 45 seconds while applying 204 volts and 36 amperes across each ribbon, then disconnect power source from ribbons.

3. Transfer mold into second zone at speed of 10 feet per minute (4 meters per minute) until mold reaches center of second zone.

4. Continue furnace heat in second zone without any further electrical power to ribbons for 1 minute during said transfer and residence.

5. Transfer mold out of second zone at speed of 20 feet per minute (8 meters per minute) into and through third zone and into fourth zone until the entire mold width was in the fourth zone.

6. Continue to move mold through the fourth zone at a speed of 20 inches per minute (0.5 meters per minute).

The ribbons were so positioned that they did not contact the shaped glass, being about ¼ inch (6 millimeters) above the upper glass surface when the mold was loaded and about 1/16 inch (1.5 millimeters) inward of the bent end portion of the shaped glass and approximately ¼ inch (6 millimeters) above the upper surface after bending.

Other bending trails were performed using the same lehr parameters for step 1 of the previous bending operation with the following ribbon heating cycles.

| Trial | Amps | Volts | Time | Remarks |
|---|---|---|---|---|
| 1 | 37 | 205 | 220 sec. | Used foil reflector beneath glass in alignment with ribbon. Assembly broke during lamination. Graphite electrodes used. |
| 2 | 35 | 203 | 356 sec. | Reflector removed. Good laminate produced. Graphite electrodes used. |
| 3 | 36 | 204 | 225 sec. | Good laminate produced. Graphite electrodes used. |
| 4 | 37 | 205 | 240 sec. | Good laminate produced. Stainless steel electrodes substituted for graphite electrodes. |
| 5 | 36 | 155 | 162 sec. | Doubled ribbon except in center section. Used heavier weights for end sections. Ribbon too high on one side. |
| 6 | 34.5 | 150 | 162 sec. | Ribbon height adjusted to 5/16 inch. Mold closed too fast. No sharp V-bends at edges. |
| 7 | 38 | 162 | 330 sec. | Ribbon height increased to 7/16 inch. Power to ribbons was continued for 45 seconds after mold closed to help sag glass along line of sharp bend. Glass did not complete sag. |
| 8 | 38 | 220 | 254 sec. | Single thickness ribbon across glass. Good laminate. |
| 9 | 36 | — | — | Ribbon broke. Poor handling. |
| 10 | 38 | 190 | 280 sec. | Ribbon single thickness except for double thickness at each 2 inch extremity. Separation between sheets good. |

Five pairs of glass sheets in a first set bent to the double V-bend using the bending lehr parameters above were each assembled as a sandwich using plasticized polyvinyl butyral 30 mils (0.8 millimeter) thick as an interlayer and subjected to conventional lamination as recited in U.S. Pat. No. 2,948,645 to Keim. The lamination comprised enclosing each sandwich in an endless split ring of fluid-impervious rubber tubing that formed a peripheral evacuation channel whose lips fitted over the edge of the assembly and evacuating the assembly at about 600 millimeters of mercury while heating the assembly for one half hour at about 120° C. The rings were removed and the sandwiches then subjected to an autoclave cycle of 45 minutes at 200 psi (13.6 atmospheres) and 275° F. (135° C.) One of the resulting laminated windshields was shipped to a potential customer. The sheets comprising this shipped windshield were bent using nichrome ribbons 3/16 inch (4.6 millimeters) wide and 0.0063 inch (0.16 millimeter) thick held ¼ inch (6.4 millimeters) above the glass. Two other sandwiches broke in the autoclave and the other two sandwiches were successfully laminated. Care must be taken to align the shaped glass sheets in the exact alignment they had during shaping on the mold to avoid breakage in the autoclave.

Successful lamination of three of the five sandwiches indicated that it was possible to bend a pair of glass sheets to a double V-bend and then laminate them successfully using readily removable ribbons to fabricate the sharp bends.

The form of the invention shown and described herein represents an illustrative preferred embodiment thereof. It is understood that various changes may be made without departing from the gist of the invention as recited in the claimed subject matter that follows.

We claim:

1. A sectionalized bending mold of the outline type for supporting glass sheets during sag bending the glass to a double V-type of bend including two lines of sharp bending comprising a mold support structure, an outline mold of concave elevation having an upward facing shaping surface of outline configuration formed by the upper shaped edge surfaces of a plurality of shaping rail sections including a pair of longitudinally extending, laterally spaced shaping rail portions forming a central mold section supported on said mold support structure, a pair of bearing housings supported by said mold support structure in laterally spaced relation to define a transversely extending line between said bearing housings, an end mold section pivotably mounted for rotation about each said pair of said bearing housings between a flat glass loading position and a closed mold position in which the upper shaped edge surfaces of said end mold sections form continuations of the upper edge surface of the longitudinal extremities of said shaping rail portions of said center section, said shaping rail portions of said section terminating in longitudinal extremities lying in a common plane to provide a common plane of support for a flat glass sheet, each longitudinal extremity of each elongated shaping rail portion of the central mold section being aligned with a corresponding longitudinal extremity of the other shaping rail portion of said central mold section along a transverse line, a contact electrode supported on and insulated from said mold support structure and located laterally outside each longitudinal extremity of each said longitudinally extending shaping rail portion and having a surface for slideably supporting a ribbon slightly above said transverse line and aligned therewith, and means carried by the mold support structure in insulated relation to said mold and mold support structure adapted for electrical connection to a source of electrical potential at one end and to said electrodes at the other end, a removable, flexible electroconductive ribbon movably supported on the said surface of each said laterally spaced pairs of electrodes and bridging the space between said laterally spaced electrodes of each said pair of electrodes, and weight means attached to said ribbon laterally outside each said electrode to support said ribbon in sliding relation to said surfaces of said electrodes and to prevent sagging of said ribbon between said electrodes, whereby said ribbon is maintained out of contact with said glass during sag bending.

2. A mold as in claim 1, wherein the ribbon-supporting surfaces of said electrodes are grooved to provide guides for mounting said ribbons between the laterally spaced electrodes of each pair of said electrodes, said grooves of said laterally spaced electrodes lying along a common line slightly above and a parallel to the transverse lines occupied by the laterally spaced longitudinal extremities of the upper surfaces of said longitudinally extending rail portions of said central mold section.

3. A mold as in claim 2, wherein said electrodes are cylindrically shaped and disposed with circumferential grooves providing said ribbon engaging surfaces for receiving said ribbons in sliding relation thereover.

4. A method of bending glass sheets to a sharp bend of double-V configuration including sharply bent end portions adjacent each of the longitudinal extremities thereof, said method comprising mounting a pair of glass sheets in superimposed aligned relation to one another over a sectionalized bending mold having a center mold section comprising longitudinally extending rail portions and end mold sections pivotably mounted with respect to said center mold section so that said glass sheets are supported on said longitudinal extremities of the center mold section and on the outer longitudinal extremities of said end mold sections, mounting a flexible, electroconductive ribbon in closely spaced relation over the glass sheets along a line aligned with each line of sharp bending desired for the glass sheet after bending, tensioning the flexible electroconductive ribbons so that they are maintained along lines transverse to said mold and spaced a short distance above the upper surface of the upper glass sheet along the lines desired for sharp bending, slidably supporting the flexible, electroconductive ribbons on contact electrodes supported on and insulated from said mold support structure, each electrode being located beyond an end of the lines of sharp bending and having a surface for slidably supporting one of said ribbons disposed slightly above the upper surface of the upper sheet of said pair, heating the glass sheets to their deformation temperature, and applying electrical current to said flexible, electroconductive ribbons by way of said electrodes to increase the heating along the lines of sharp bending when the overall temperature of the glass approaches its deformation temperature so that said glass sheets sag sharply along said transversely extending lines of sharp bending to conform to the shaping surface of said mold and the end mold sections pivot to form a continuous shaping surface conforming in elevation and outline to the shape desired for the glass sheet sagged onto said mold.

5. The method as in claim 4, wherein said sheets are initially supported on the longitudinal extremities of the center section of said mold at points aligned with and below the lines along which said ribbons extend.

6. The method as in claim 5, wherein said electric current is applied for a relatively short portion of said heating cycle.

7. The method as in claim 5, wherein said flexible electroconductive ribbons are supported along lines extending obliquely above and across the width demension of said glass sheets.

8. The method as in claim 4, wherein said application of electric current is stopped before said overall heating is stopped.

* * * * *